June 10, 1924.

H. R. HOLTZ

COWL VENTILATOR

Filed Nov. 16, 1922

1,496,934

INVENTOR.
HAROLD R. HOLTZ.
BY White Prost & Evans
ATTORNEYS.

WITNESS:

Patented June 10, 1924.

1,496,934

UNITED STATES PATENT OFFICE.

HAROLD R. HOLTZ, OF SAN FRANCISCO, CALIFORNIA.

COWL VENTILATOR.

Application filed November 16, 1922. Serial No. 601,383.

*To all whom it may concern:*

Be it known that I, HAROLD R. HOLTZ, a citizen of the United States, and a resident of the city and county of San Francisco, State of California, have invented certain new and useful Improvements in Cowl Ventilators, of which the following is a specification.

My invention relates to ventilators and more particularly to cowl ventilators for motor vehicles.

An object of my invention is to provide a readily adjustable ventilator that will not rattle in any open, or its closed position, and of such exterior appearance that it will not detract from the body lines of a vehicle.

Another object is to provide a ventilator of simple and substantial construction, allowing ample ventilation of the driver's compartment of the vehicle, and readily adjustable by the driver as to the area of its opening.

A further object is to provide a cowl ventilator that, having been set in a predetermined position, will remain in that position regardless of vibration and road shocks.

The invention possesses other features of advantage, some of which with the foregoing will be set forth in the following description of the preferred form of my invention, and illustrated in the accompanying drawings.

It is to be understood that I do not limit myself to the construction shown as varying forms of construction may be resorted to without departing from the spirit of my invention as claimed.

Referring to the drawings:—

Figure 1:
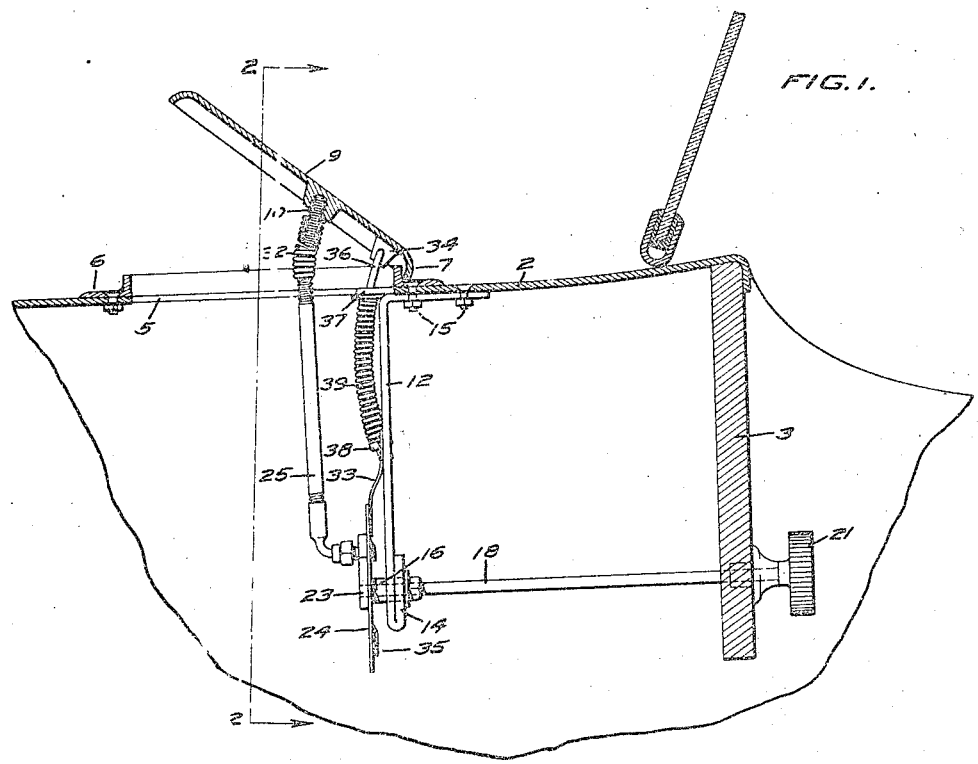
Figure 1 is a fragmentary view in elevation, and partly in section, illustrating my device as installed in the cowl of a vehicle.

In Fig. 1 I have shown a fragmentary portion of a motor vehicle, including the cowl 2, conventional windshield, and the instrument board 3, disposed within convenient reach of the driver.

Formed in the cowl 2 and preferably centrally disposed in relation to the longitudinal center line of the body, is an opening 5. Surrounding the opening and suitably secured to the cowl is a flanged frame 6, illustrated in the present instance as a metal casting.

Designed to form a closure for the opening 5 when seated on the frame 6, is a cover plate 9 pivotally disposed on the frame 6 on one of its shallow side walls 7.

Extending downwardly from the cowl 2, is a bar 12, bent double at its lower end to provide a bearing 14. The upper end of the bar may be secured to the cowl 2 by suitable means such as the bolts 15, one of which also secures the frame 6.

Journalled in the bearing 14, is a bushing 16, through which an operating rod 18 extends, one end of the rod extending through the instrument board 3 and being provided with an operating knob 21. Secured to the other end of the rod is a disk 24 and a crank arm 23. Means are provided for connecting the crank arm to the cover plate. The connecting means are such that they will not rattle and will hold the closure plate in adjusted position. Projecting from the underside of the closure plate 9 is a threaded stem 10 and secured to the crank arm 23 at its outer end for universal movement in relation thereto, is a threaded rod 25. A spiral spring 32 connects the stem and rod, being screwed onto the threaded ends thereof. The distance of travel of the threaded stem 10 is less than the distance of travel of the connector 25, so that when the crank arm is turned to its downward position, the spring is placed under tension, thus holding the closure plate tightly in place. One of the threaded stems, preferably the lower stem 25, is made long, so that by screwing the spring onto it for variable distances, the normal length of the spring may be varied. The device is thus adjustable to meet varying conditions in different automobiles.

Means are provided for holding the closure plate in any desired position of adjustment. The disk 24 is formed with a plurality of circumferentially spaced tongues 35 upset from its surface. Bearing against the disk at the tongue portion is a flat spring 33. The spring prevents counterrotation of the disk, prevents its accidental rotation, and presses it forwardly so that longitudinal movement of the shaft 18 is avoided.

Means are also provided whereby the cover plate 9 is resiliently pivotally disposed on the frame 6, the said resilient pivotal means providing additional rattle preventing means when the cover plate is closed or open. Formed on the under side of the cover plate, substantially in the two rear corners thereof adjacent the side walls 7, are a pair of apertured lugs 34. Pivotally secured at one end to each lug 34 is an arcuate rod 36 adapted to pass thru a guide 37 formed on the frame 6, and threaded at its opposite end to receive a nut 38. A compression spring 39 is disposed on the rod between the nut 38 and the guide 37, the pull exerted by the springs maintaining firm contact between the rear wall 7 of the cover plate and the frame 6. Forward movement of the cover plate on the frame is prevented by the flange formed thereon.

Figure 2:
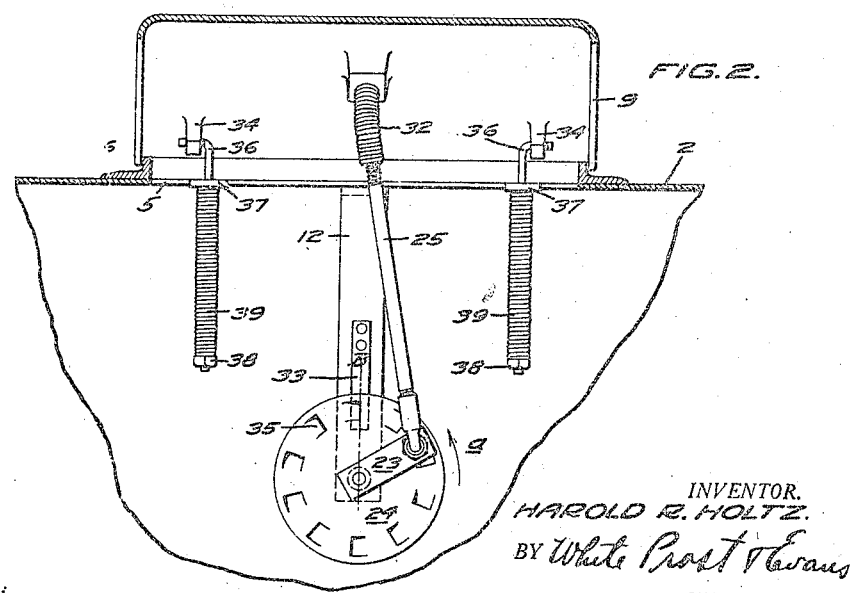
Fig. 2 is a section taken on line 2—2, of Fig. 1, looking in the direction of the arrows toward the driver's seat.

In operation, it will be seen, that, assuming the crank arm to be in its top vertical position, the cover plate is firmly supported by the spring 32 and rod 25, against the pull of the springs 39 and the spring latch 33 acts to hold the crank arm in position. Revolving the rod 18 in the direction of the arrow A till the crank assumes the position indicated by the dotted line B in Fig. 2, opens the cover plate against the tension of the springs 39. Further revolution of the crank to vertical bottom position closes the cover plate and exerts a tensional pull by means of the springs 39 and 32, securing it against vibration. Of course the cover plate may be adjusted to any desired opening between these two extremes and in each position, rattling is effectively prevented.

I claim:

1. An automobile cowl ventilator comprising a pivotally mounted closure plate, a crank, a handle for rotating said crank, a disk rotatable with said crank, a spring frictionally engaging said disk, and a flexible element connecting the crank and the closure plate.

2. An automobile cowl ventilator comprising a pivotally mounted closure plate, a crank, a handle for rotating said crank, a disk rotatable with said crank, a plurality of circumferentially disposed projections on the rear face of said disk, a flat spring engaging said rear face in the zone of the projections, and a flexible element connecting the crank and the closure plate.

3. An automobile cowl ventilator comprising a pivotally mounted closure plate, a threaded projection on the underside of said plate, a crank, a threaded rod mounted for universal movement on said crank, and a helical spring screwed onto said projection and rod.

4. An automobile cowl ventilator comprising a frame, a closure plate pivotally disposed on said frame, a crank, a rod pivotally mounted on said crank, a spring connecting said rod to said plate, and resilient means for holding the pivoted edge of the closure plate in contact with the frame.

5. An automobile cowl ventilator comprising a frame, a pivotally disposed closure plate on said frame, a crank, a rod pivotally mounted on said crank, a helical spring connecting said rod to said plate, a link pivoted to said cover plate adjacent its pivoted edge, and a spring disposed between said frame and link to resist opening of said cover plate.

In testimony whereof, I have hereunto set my hand.

HAROLD R. HOLTZ.